US007020593B2

(12) United States Patent
Hong et al.

(10) Patent No.: US 7,020,593 B2
(45) Date of Patent: Mar. 28, 2006

(54) METHOD FOR ENSEMBLE PREDICTIVE MODELING BY MULTIPLICATIVE ADJUSTMENT OF CLASS PROBABILITY: APM (ADJUSTED PROBABILITY MODEL)

(75) Inventors: Se June Hong, Yorktown Heights, NY (US); Jonathan R. Hosking, Scarsdale, NY (US); Ramesh Natarajan, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 10/309,191

(22) Filed: Dec. 4, 2002

(65) Prior Publication Data

US 2004/0111169 A1 Jun. 10, 2004

(51) Int. Cl.
   *G06F 15/18* (2006.01)
(52) U.S. Cl. .................. 703/2; 703/6; 706/12; 706/14; 706/20
(58) Field of Classification Search .................. 703/2, 703/6, 22; 706/20, 12, 14; 702/19; 341/107
   See application file for complete search history.

(56) References Cited

U.S. PATENT DOCUMENTS

| | | | | |
|---|---|---|---|---|
| 5,930,803 | A * | 7/1999 | Becker et al. | 707/104.1 |
| 6,038,388 | A * | 3/2000 | Hogden et al. | 703/6 |
| 6,058,206 | A * | 5/2000 | Kortge | 382/159 |
| 6,388,592 | B1 * | 5/2002 | Natarajan | 341/107 |
| 6,546,379 | B1 * | 4/2003 | Hong et al. | 706/14 |
| 6,941,287 | B1 * | 9/2005 | Vaidyanathan et al. | 706/12 |
| 2002/0010691 | A1 * | 1/2002 | Chen | 706/20 |
| 2004/0068697 | A1 * | 4/2004 | Harik | 715/513 |
| 2004/0111220 | A1 * | 6/2004 | Ochs et al. | 702/19 |

OTHER PUBLICATIONS

Hand et al.; "Idiot's Bayes—Not So Stupid After All?"; International Statistical Review (2001); pp. 385-398.
Gartner et al.; "WBCsvm: Weighted Bayesian Classification based on Support Vector Machines"; ICM 2001; pp. 154-161.
Spiegelhalter et al.; "Statistical and Knowledge-based Approaches to Clinical Decision-support Systems, with an Application in Gastroenterology"; Royal Statistical Society A(1984);1147, Part 1; pp. 35-59.

(Continued)

*Primary Examiner*—Thai Phan
(74) *Attorney, Agent, or Firm*—Whitham, Curtis & Christofferson, P.C.; Stephen C. Kaufman (57) ABSTRACT

A new method is used to model the class probability from data that is based on a novel multiplicative adjustment of the class probability by a plurality of items of evidence induced from training data. The optimal adjustment factors from each item of evidence can be determined by several techniques, a preferred embodiment thereof being the method of maximum likelihood. The evidence induced from the data can be any function of the feature variables, the simplest of which are the individual feature variables themselves. The adjustment factor of an item of evidence $E_j$ is given by the ratio of the conditional probability $P(C|E_j)$ of the class C given $E_j$ to the prior class probability $P(C)$, exponentiated by a parameter $a_j$. The method provides a new and useful way to aggregate probabilistic evidence so that the final model output exhibits a low error rate for classification, and also gives a superior lift curve when distinguishing between any one class and the remaining classes. A good prediction for the class response probability has many uses in data mining applications, such as using the probability to compute expected values of any function associated with the response, and in many marketing applications where lift curves are generated for selected prioritized target customers.

10 Claims, 8 Drawing Sheets

OTHER PUBLICATIONS

Piatelsky-Shapiro et al.; "Measuring Lift Quality in Database Marketing"; SIGKDD Explorations, ACM SIGKDD; Dec. 2000; pp. 76-80.

Langley et al.; "Induction of Selective Bayesian Classifiers"; Proceedings of the Tenth Conference on Uncertainty in Artificial Intelligence (1994); pp. 399-406.

Domingos et al.; "On the Optimality of the Simple Bayesian Classifier under Zero-One Loss"; Machine Learning; 1997; pp. 103-130.

Garg et al.; "Understanding Probabilistic Classifiers"; ECML, 2001, LNAI 2176; pp. 179-191.

Friedman et al.; "Bayesian Network Classifiers"; Kluwer Academic Publishers, Boston, MA; pp. 1-37.

* cited by examiner

| Features \ Examples | Input Features | | | | | Target Feature |
|---|---|---|---|---|---|---|
| | $X_1$ | $X_2$ | ... $X_j$ | ... | $X_m$ | $y$ |
| $e_1$ | Red | 1.2 | | | | 1 |
| $e_2$ | Blue | 1.2 | | | | 0 |
| ⋮ | | | | | | |
| $e_i$ | | | | | | |
| ⋮ | | | | | | |
| $e_n$ | | | | | | |

*Figure 1*

| Examples \ Probabilities | Sub-Model Probabilities | | | | | Target |
|---|---|---|---|---|---|---|
| | $X'_1$ | $X'_2$ ••• | $X'_j$ | ••• | $X'_m$ | $y$ |
| $e_1$ | 0.01 | 0.02 | | | | 1 |
| $e_2$ | 0.2 | 0.95 | | | | 0 |
| ⋮ | | | | | | |
| $e_i$ | | | | | | |
| ⋮ | | | | | | |
| $e_n$ | | | | | | |

METHOD FOR ENSEMBLE PREDICTIVE MODELING BY MULTIPLICATIVE ADJUSTMENT OF CLASS PROBABILITY: APM (ADJUSTED PROBABILITY MODEL)

BACKGROUND OF THE INVENTION

1. Field of the Invention

The present invention generally relates to a new method for aggregating individual items of evidence for class probability estimation of a response variable in a classification problem. A good prediction for the class response probability has many uses in data mining applications, such as using the probability to compute expected values of any function associated with the response, and in many marketing applications where lift curves are generated to select prioritizing target customers.

2. Background Description

The Naïve Bayes (NB) model for classification problems is attractive for its simplicity and its good model understandability There have been several studies of how well the model performs as a classifier. P. Domingos and M. Pazzani in "On the Optimality of the Simple Bayesian Classifier under Zero-One Loss", *Machine Learning*, 29, pp. 103–130, 1997, explore theoretical conditions under which NB may be optimal even though its assumption of independence of the feature values given the class may not hold, and also supply empirical evidence. D. J. Hand and K. Yu in "Idiot's Bayes-Not so Stupid After All", *International Statistical Review*, 69, pp. 385–398, 2001, give arguments on why the independence assumption is not so absurd. A. Garg and D. Roth in "Understanding Probabilistic Classifiers", *Proceedings of ECML-2001*, 2001, consider all joint distributions and show that the number of these distributions goes down exponentially with their distance from the product distribution of NB, thereby explaining the power of NB beyond the independence assumption. These studies focus on classification error.

The basic NB model has been modified and extended in several ways to remove some of its limitations. For example, P. Langley and S. Sage in "Induction of Selective Bayesian Classifiers", *Proceedings of the Tenth Conference of Uncertanty in Artificial Intelligence*, Morgan Kaufman, Seattle, Wash., pp. 399–406, 1994, use a feature subset selection approach to eliminate potential conditionally-correlated features. Other approaches such as the Tree Augmented Naïve-Bayes (TAN) model of N. Friedman and M. Goldszmidt in "Building Classifiers Using Bayesian Networks". *Proceedings of the Thirteenth National Conference of Artificial Intelligence*, Menlo Park, pp. 1277–1284, 1966, generalize NB by relaxing restrictive conditional independence assumption.

In many data mining applications, the desired model output is the class probability. Examples include marketing applications in which a mailing is sent out to consumers whose estimated probability of response to the mailing exceeds a given level. This level is chosen to maximize expected profit, based on a "lift curve" (e.g., G. Piatetsky-Shapiro and S. Steingold, "Measuring Lift Quality in Database Marketing", *SGKDD Explorations*, 2, pp. 76–80, 2000).

While the usual NB approach is already known to be quite effective in predicting class membership, there are many applications where estimation of class probability is of prime importance (such as when these probabilities are used to generate lift curves).

SUMMARY OF THE INVENTION

It is therefore an object of the present invention to provide a new model derived from a novel interpretation of NB that results in improved class probability estimation.

According to the invention, the new model yields class probability estimates that are given by the prior probability of the class with successive multiplicative adjustments arising from the evidence supplied by each feature. This new model is referred to as the Adjusted Probability Model (APM). Each adjustment factor has an associated importance parameter that is estimated by fitting a logistic regression model. The formulation of APM is therefore a new way of aggregating the outputs of an ensemble of models. The aggregation uses multiplicative adjustments, in contrast to additive aggregation done by boosting or bagging. The invention also introduces a regularized version of APM, called APMR.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

The present invention specifically relates to a method and procedure for class probability estimation of a target or response feature based on a novel multiplicative adjustment of the class prior probability by a plurality of items of evidence that are induced from the explanatory features in the training data, wherein the optimal adjustment factor for each item of evidence can be determined by several techniques, a preferred embodiment thereof being the method of maximum likelihood. Each individual item of evidence to be aggregated in this way is induced from the training data, and can be a function of one or possibly many of features in the training data. The invention provides a new and useful way of aggregating probabilistic evidence into a final model that often has a lower classification error rate, when compared to prior art. This approach also leads to models with more accurate class probability estimates, in turn leading to lift curves for distinguishing between any one class and the remaining classes, that are often superior to those obtained by models in prior art. Lift curves are used to prioritize and select target customer groups for marketing promotions in retail and consumer applications. The accurate class probability estimates from the present modeling approach are also useful in applications where it is necessary to compute the expected values of any function of the target response (e.g., maximizing profit in a marketing application, where the expected profit is a function of the marketing overhead and the magnitude of the individual sale realized from each respondent).

The present invention pertains to a given data set consisting of an n×m, matrix X where the n rows represent distinct training examples, and the m columns represent the explanatory feature variables. The features X values of the ith example comprise the ith row of X (which we denote by the vector $X_i$), and the corresponding class membership value is identified as $y_i$ which can take the values 1 and 0 depending whether the example belongs to the class of interest or not, respectively. We denote the set of class values as a column vector y. The present invention is also applicable to the case where the class membership variable $y_i$ is a multi-valued ($\geq 3$) class variable, or can even be a class membership probability value. Here, if the response variable $y_i$ takes on k different values, then we construct k different APM models by the present method with a separate model for each class value versus the rest of the classes combined.

The objective of the present invention is to generate a model from the training data (X,y) that estimates the probability that the example belongs to class 1 or class 0, for a new example with feature values for $x_1$ through $x_m$. Each item of evidence $E_j$ can be just one of the original features in the training data X, or a derived feature based on transforming one or more of the original features in X, or even the output of a probabilistic model such as decision trees or neural network built using the original data (X,y). Therefore, $E_j$ represents a function of X, i.e., $E_j(X)$. Therefore, the number of such items of evidence, m', can be different in general from the original number of features m in the training data.

We now describe the Adjusted Probability Model (APM) for a class C in a two class problem (consisting of the given class C, and the complementary class $\overline{C}$). In the adjusted probability model, the estimate of the probability of membership of class C is given by the proportionality $$P(C|X) \propto P(C) \times \prod_{j=1}^{m'} \left[ \frac{P(C|E_j)}{P(C)} \right]^{a_j}, \quad (1)$$

where P(C) is the prior probability of the class C, and $P(C|E_j)$ is the probability of the class C given the evidence $E_j(X)$, with $P(C|E_j)$ being directly estimated from the examples in the training data (X,y). (Note that equation (1) along with the condition $P(C|X)+P(\overline{C}|X)=1$ fully defines the probability model.) The class probability is thus expressed as the prior probability of the class multiplied by adjustment factors, $$\left[ \frac{P(C|E_j)}{P(C)} \right]^{a_j}$$

due to the various items of evidence, where $a_j$ has the role of controlling the influence of the raw ratio $P(C|E_j)/P(C)$. The estimation procedure involves unconstrained and constrained optimization procedures for obtaining the optimal values for the $a_j$ parameters, as shown in the detailed description below.

The present invention is an improvement on the prior art. In a particular special case, when the sub-models that are being aggregated are simply the individual class probability predictions of each of the original explanatory features taken individually, and further when the $a_j$ parameters are not optimized at all, but are set uniformly to 1, then equation (1) is equivalent to the well-known Naïve Bayes Model. This equivalence in this special case has been noted by D. J. Spiegelhalter and R. P. Knill-Jones, "Statistical and knowledge-based approaches to clinical decision-support systems, with an application to gastroenterology", *Journal of the Royal Statistical Society, Series A*, Vol. 147, pp. 35–77, 1994, who have proposed a model similar to equation (1), and with a maximum-likelihood based optimization procedure to obtain their weights (which are equivalent to our $a_j$ values). This approach is therefore similar to our APM (but it uses only the original features in the data, and it also does not have the generalization to our APMR method, which incorporates regularization). There is another critical difference in the modeling approach of Spiegelhalter and Knill-Jones, who also fit a parameter $a_0$ for the prior probability in the form $P(C)^{a_0}$ (instead of the corresponding term P(C) without this parameter for the first factor in our equation (1)). Another related approach in the prior art is the $WBC_{SVM}$ model (see T Gaertner and P. A. Flach, "$WBC_{SVM}$: Weighted Bayesian Classification based on Support Vector Machines", *Proceedings of the International Conference on Machine Learning* 2001, pp. 154–161, 2000). The model used in this approach is similar to our equation (1), but with only the individual class predictions of the original explanatory features being used, and this model also uses an $a_0$ parameter for the prior probability in the form $P(C)^{a_0}$. The optimization procedure used by them for estimating the $a_j$ coefficients is the well-known support vector machine (SVM) technique (as described for example in B Schoelkopf, C. J. C. Burges and Alexander J. Smola (eds.), *Advances in Kernel Methods—Support Vector Learning*, MIT Press, Cambridge Mass., 1999). The SVM optimizing procedure has a regularizing property for the $a_j$ parameters with the same flavor as our APMR method; however, the loss function in the SVM approach is optimized for the classification error and not for the class probability. Therefore, the model produced by $WBC_{SVM}$ is not optimal for obtaining the class probability estimates, when compared to the our approach using the loss function given by equation (7), below.

Figure 1:
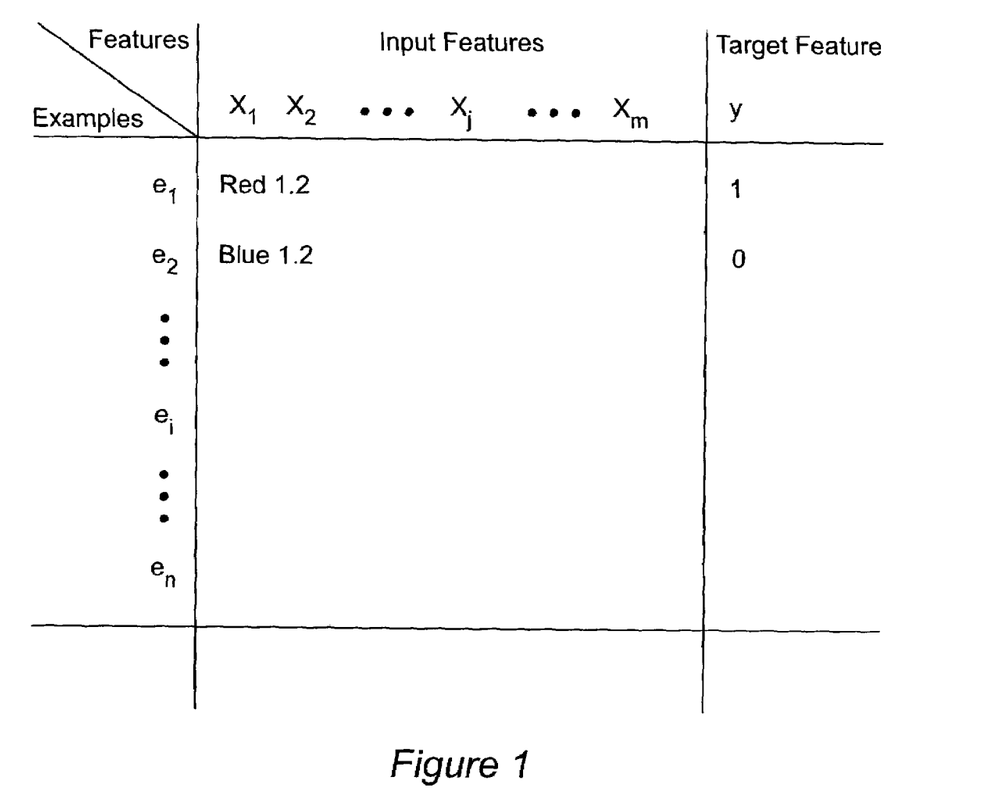
FIG. 1 is a matrix showing the training data of explanatory feature values.

Referring now to the drawings, and more particularly to FIG. 1, there is shown the training data consisting of the n×m data matrix X of the explanatory feature values for each example, and the n×1 response column y consisting of the target feature value to be modeled. The target feature $y_i$ can be binary class labels which can be denoted "0" or "1" (without loss of generality, where "1" corresponds to the desired class outcome for the target features). The target feature $y_i$ can also be a multi-valued class variable, or even class membership probability taking values in the range $0 \leq y_i \leq 1$. As indicated in FIG. 1, the explanatory features can either be numerical as shown for $X_1$ or binary/multi-valued categorical features as shown for $X_2$.

Figure 2:
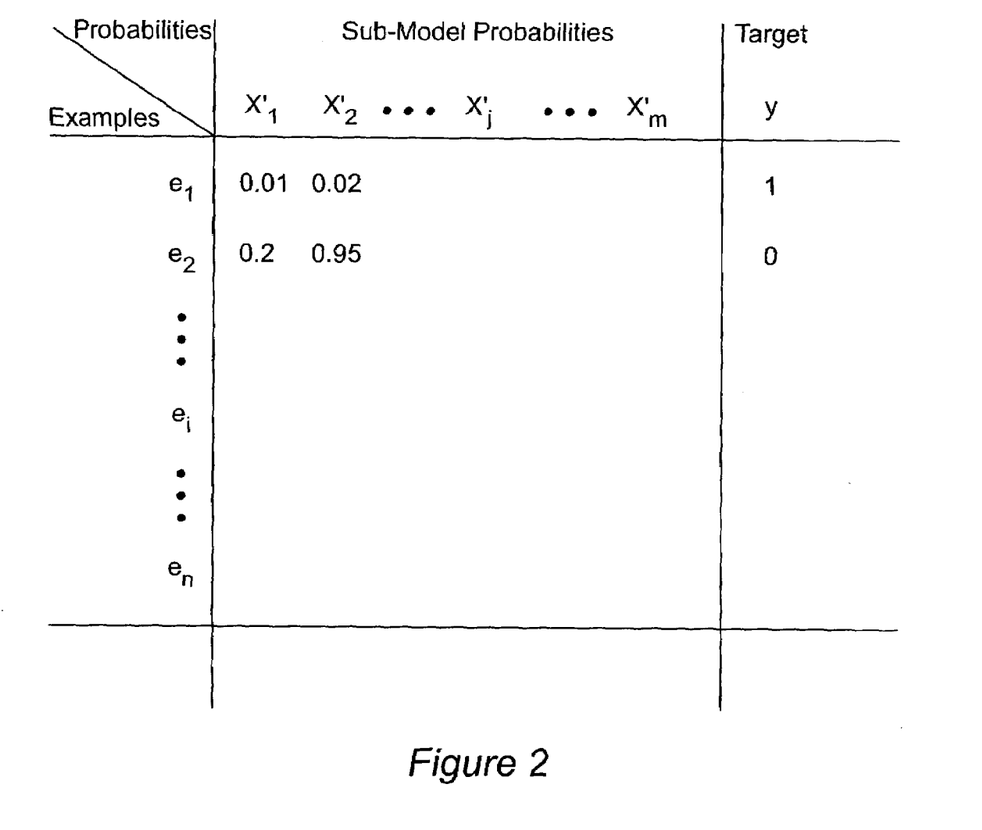
FIG. 2 is a matrix showing the transformed data obtained from the training data of FIG. 1.

FIG. 2 shows the transformed data consisting of the n×m' matrix of probability estimates of the sub-models obtained from the training data matrix in FIG. 1. The n×1 response column y is identical to column y of FIG. 1. (For expository purposes, we only describe the case when $y_i$ is a 0/1 binary response variable, with $y_i=1$ being the desired outcome.) The entries of each row of the n×m' matrix in FIG. 2 are therefore based on the corresponding row in the data matrix X in FIG. 1, and are the class 1 probability estimates $P(C|E_j)$ of the m' probability sub-models constructed from the training data. In the special but common case, when each sub-model is based on a single feature in data matrix X in FIG. 1, then $P(C|E_j)=P(C|x_1)$ and m'=m. In this case, if $x_1$ is a nominal feature, then the required probabilities are directly given by the fractional counts in the training data for each value taken by the feature $x_j$. Similarly, if $x_j$ is a numerical feature, then a variety of methods in the prior art may be used to obtain $P(C|x_j)$, including pre-discretization of the range of $x_j$ so that it may be treated as a nominal variable, or using kernel density estimation to directly model the univariate conditional probability distribution. More generally, the sub-models could be based on any multivariate combination of the original explanatory features (strategies for obtaining such sub-models may include well-known techniques in the prior-art such as decision trees, neural networks, etc.), and for this case, m' may be different from m.

Figure 3:
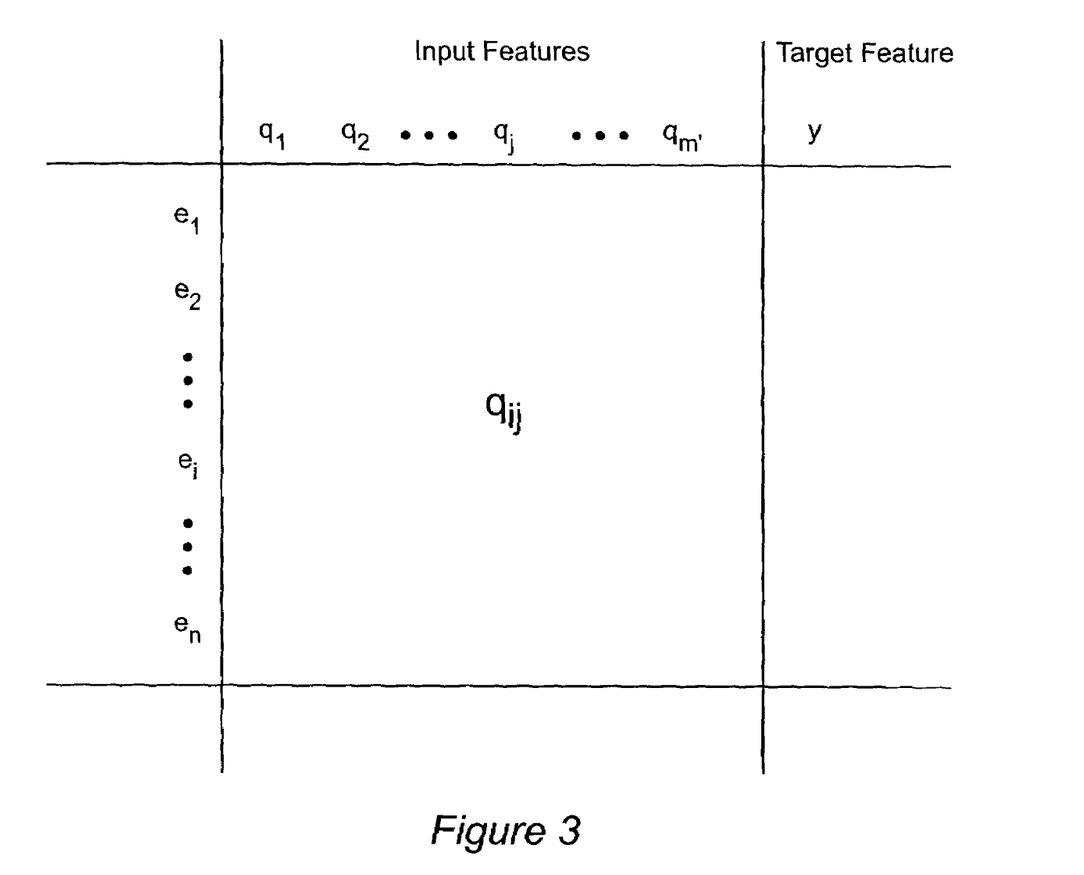
FIG. 3 is an illustration of the Q matrix.
Figure 4:
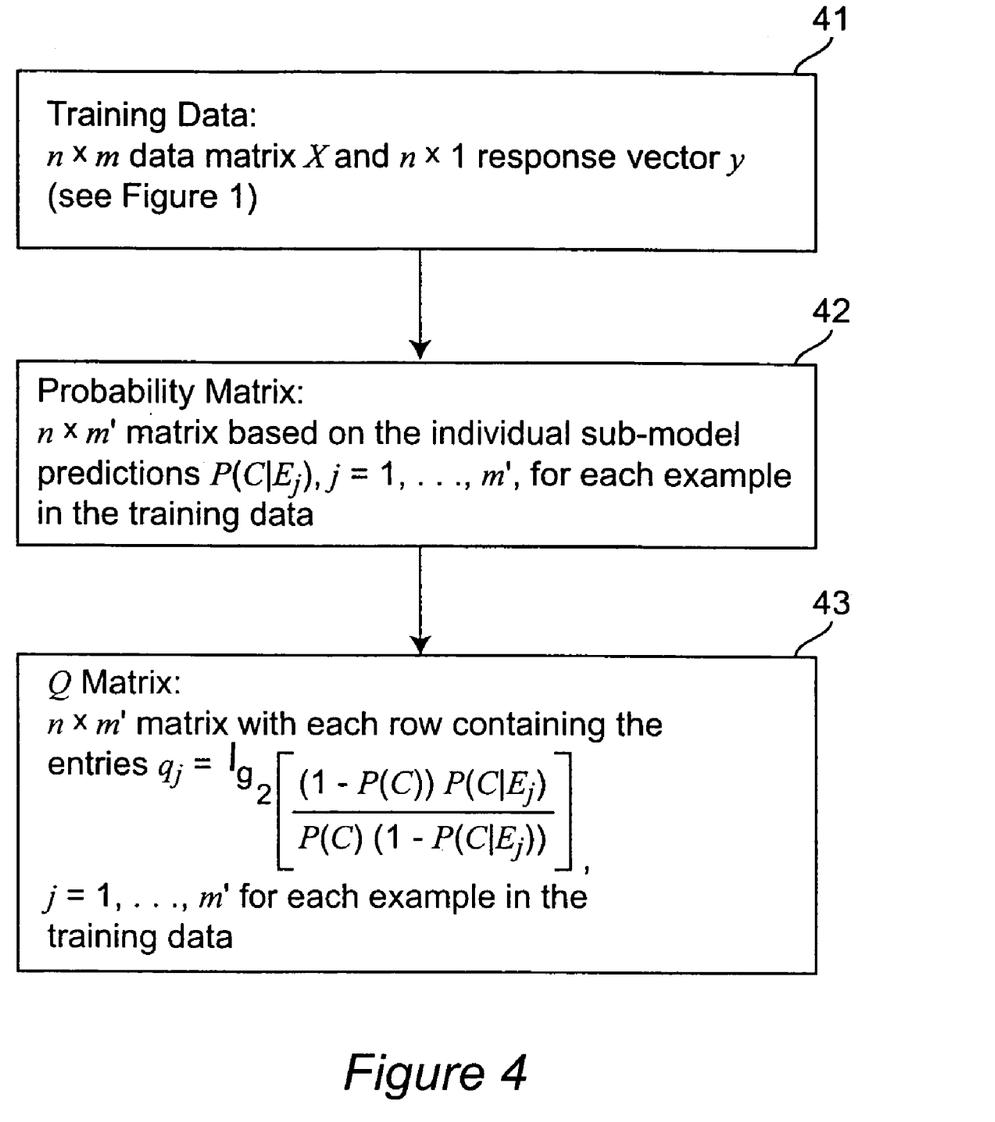
FIG. 4 is a flow diagram illustrating the process of data transformation.

FIG. 3 shows the Q matrix, where the entry $q_{ij}$ is computed by $$q_{ij} = lg_2\left(\frac{(1-P(C))P(C|X_{ij})}{P(C)(1-P(C|X_{ij}))}\right),$$

where P(C) is the prior probability. The data transformation to generate the Q matrix is illustrated in the flow diagram of FIG. 4, to which reference is now made.

The process begins in function block 41 with the training data. This is the n×m data matrix X and n×1 response vector y. See FIG. 1. Next, in function block 42, the probability matrix is generated. This is an n×m' matrix based on the individual sub-model predictions $P(C|E_j), j=1, \ldots, m'$, for each example in the training data. Finally, in function block 43, the Q matrix is generated from the n×m' probability matrix with each row containing the entire $$q_j = lg_2\left(\frac{(1-P(C))P(C|E_j)}{P(C)(1-P(C|E_j))}\right), j=1, \ldots, m'$$

for each example in the training data.

The preferred method steps of the overall invention are now disclosed. The probability of being in the class C given X is P(C|X), the prior probability of being in class C is P(C), and the probability of being in class C given evidence $E_j$ is $P(C|E_j)$. Similarly, the probability of not being in the class C given X is 1−P(C|X), the prior probability of not being in class C is 1−P(C), and the probability of not being in class C given evidence $E_j$ is $1-P(C|E_j)$. Then, after some algebra, equation (1) can then be written in the form $$P(C|X)=1/[+1\exp\{-(q_0+\Sigma_1 a_j q_1)\}], \quad (2)$$

where $$q_0=lg_2[P(C)/\{1-P(C)\}], \quad (3)$$

and $$q_1=lg_2[P(C|E_j)\times(1-P(C))/\{(1-P(C|E_j))\times P(C)\}]=lg_2\{P(E_j|C)/P(E_j|\overline{C})\} \quad (4)$$

In the case when the items of evidence are the original feature values themselves, we have m=m' and $$q_1=lg_2[P(C|x_j)\times(1-P(C))/(1-P(C|x_j))\times P(C)]. \quad (5)$$

For simplicity and brevity, we consider this formulation in our further exposition, noting that the more general formulation in equation (4) can be obtained by merely replacing $x_j$ by the derived feature in place of $E_j(X)$ in the description below.

We now describe a method to determine the optimum $a_j$ values from equation (5). This method is known in the state of the art as the method of maximum likelihood. For each example $X_i$ we have a corresponding vector $Q_1$ whose elements are the $q_1$'s computed from the corresponding $x_j$ values of the ith example $X_i$. In this way, from the training set X we obtain a transformed matrix Q (in which the ith row is denoted by $Q_1$). When additional items of evidence are available, they can be incorporated as new features beyond $q_m$ with properly expanded Q.

The likelihood for the data (X,y) is given by $$L = \prod_{i=1}^{n} P(C|X_i)^{y_i} \times (1-P(C|X_i))^{1-y_i}. \quad (6)$$

It is well known that maximizing this likelihood function is equivalent to minimizing the loss function obtained by taking the negative logarithm of L in equation (6).

$$\text{Loss} = -\sum_{i=1}^{n} [y_i lg_2 P(C|X_i) + (1-y_i) lg_2(1-P(C|X_i))]. \quad (7)$$

This is an often-used measure for evaluating the goodness-of-fit for class probability predictions, and this measure can be optimized to obtain the optimal values of the $a_j$ parameters. The resulting model of P(C|K) in equation (2) with the optimal $a_j$ parameters is called the Adjusted Probability Model or APM.

The minimization of the loss function in equation (7) can be carried out by several state of art optimization techniques. Our preferred embodiment for obtaining the optimal set of [alpha j s] is the following iterative procedure in steps (1) to (6). Other well known techniques for this optimization can be used here depending on the data size and characteristics by persons skilled in the art. Let a be an m-vector consisting of the $a_j$'s, and let P be an n-vector whose ith element is $P_i=P(C|X_i)$ as computed from equation (2) using the current set of $a_j$ values. The following procedure is illustrated in the flow diagram of FIG. 5. The process begins in function block 51 with the generation of the Q matrix, as shown in FIG. 4.

Figure 5:
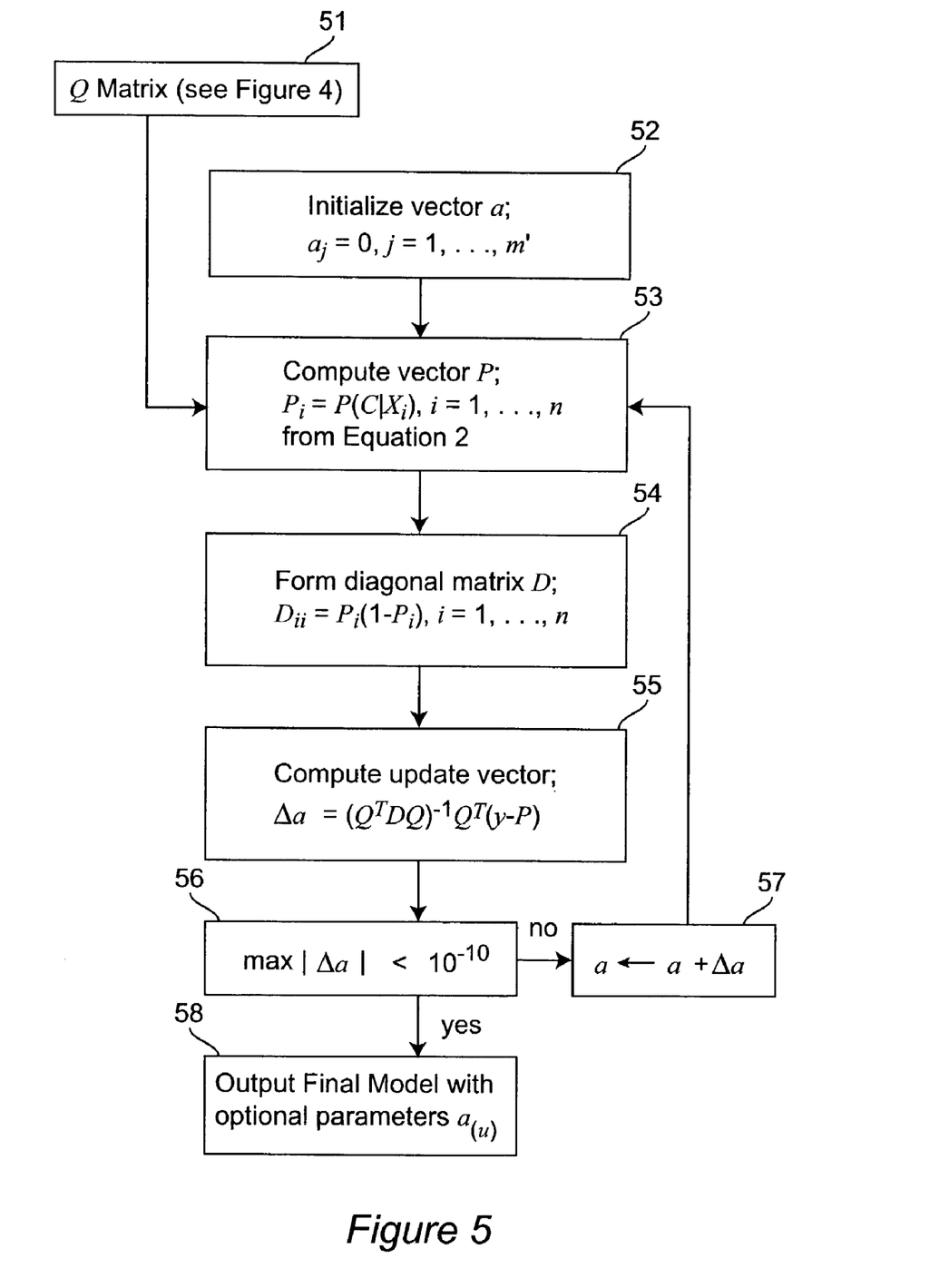
FIG. 5 is a flow diagram illustrating the logic of the APM procedure according to invention.

Procedure 1: APM—optimization and parameter estimation procedure:

1) Initialize, in function block 52, $a_j=0$ for j=1 through m, i.e., a=0. Alternatively, one can set all the values in a to some small value, e.g., $10^{-10}$.

An iteration loop is entered at function block 53:

2) Compute in function block 53 vector P; $P_i=P(C|X_i)$, i=1, ..., n from Equation (2).
3) Form in function block 54 a diagonal matrix D whose ith diagonal element is $P_i(1-P_i)$.
4) Compute in function block 55 the update $\Delta a=(Q^TDQ)-1Q^T(y-P)$.
5) Determine in decision block 56 whether the maximum value of $\Delta a$ is less than a predetermined value, say $10^{-10}$.
6) If not, update in function block 57 $a \leftarrow a+\Delta a$ before returning to function block 53 in the iteration loop.

7) Otherwise, stop and output in function block 58 the final model with optimal parameters $a_{(u)}$, where the subscript (u) stands for "unconstrained".

In order to avoid over fitting, one can obtain the a that minimizes the loss function subject to a regularization constraint $M=\Sigma a_j^2 = \|a\|^2$, for some suitably chosen optimal value $\hat{M}$ as described below. We call the model with this constraint $M=\|a\|^2$ as APMR, although without confusion below, we also use APMR to refer to the final model that is with the optimal value $\hat{M}$ for M. The minimization of the loss function in equation (7) with this constraint is carried out by using the Lagrange multiplier technique, and the optimal values of a are obtained by the following iterative procedure in steps (1) through (10) below. Here, we let $\lambda$ be an m vector denoting the Lagrange multipliers, and where appropriate below it also denotes the corresponding m×m diagonal matrix. The following procedure is illustrated in the flow diagram of FIG. 6 Again, the process begins in function block 61 with the generation of the Q matrix, as shown in FIG. 4.

Figure 6:
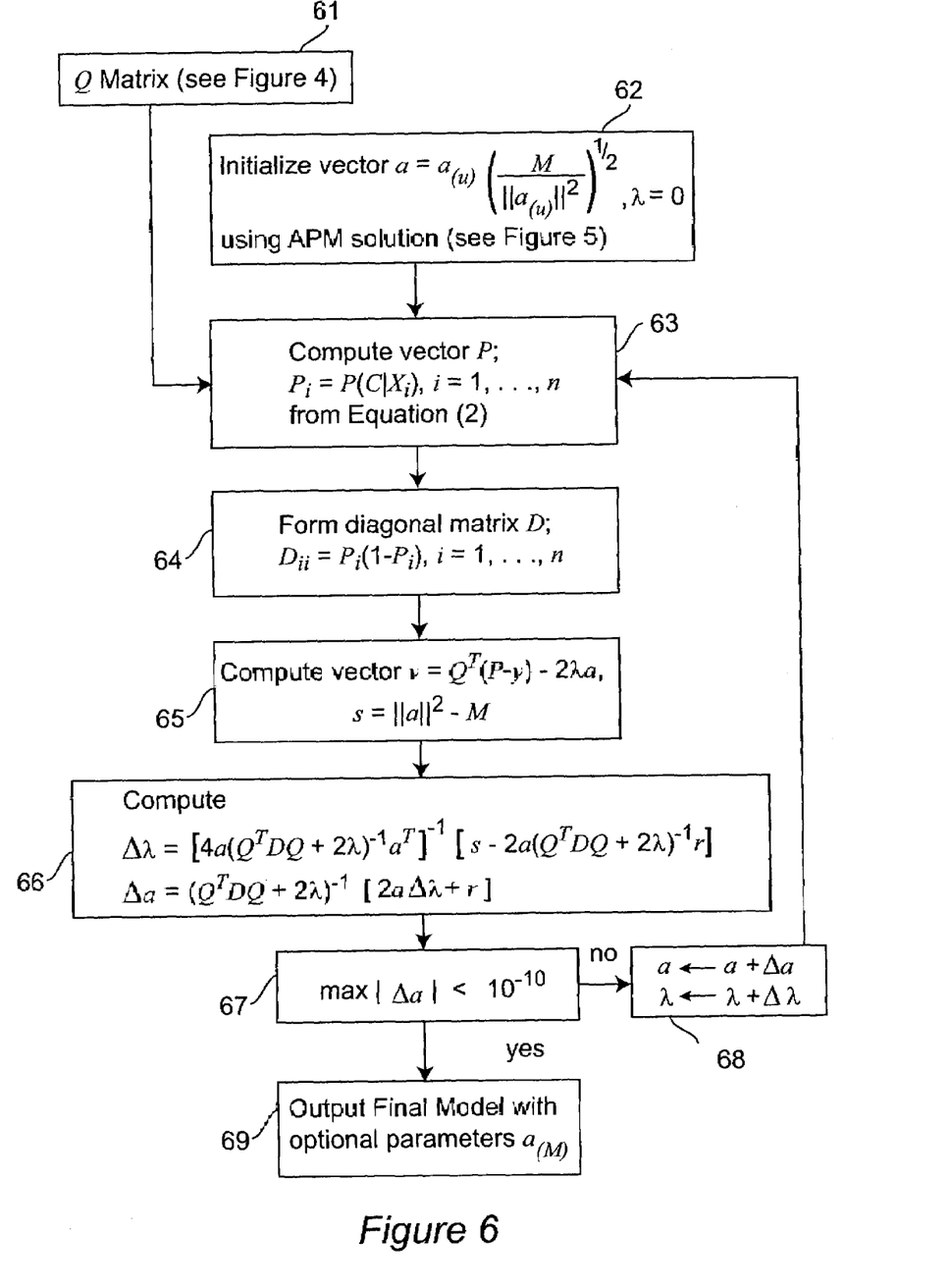
FIG. 6 is a flow diagram illustrating the logic of the constrained optimization APMR procedure according to the invention.

Procedure 2: APMR—optimization and parameter estimation procedure:

1) Initialize, in function block 62, $$a = a_{(u)}\left(\frac{M}{\|a_{(u)}\|^2}\right)^{\frac{1}{2}}$$

and $\lambda=0$, where $\|a_{(u)}\|$ denotes the sum of squares of the elements, using the APM solution shown in FIG. 5.

An iteration loop is entered at function block 63:

2) Compute in function block 63 P: $P_i=P(C|X_i)$, $i=1, \ldots, n$ from Equation (2).

3) Form in function block 64 a diagonal matrix D whose ith diagonal element is $P_i(1-P_i)$, $i=1, \ldots, n$ 4) Compute in function block 65 vector $v=Q^T(P-y)-2\lambda a$ and vector $s=\|a\|^2-M$.

5) Compute in function block 66

$\Delta\lambda=[4a(Q^TDQ+2\lambda)^{-1}a^r]^{-1}[s-2a(Q^TDQ+2\lambda)^{-1}r]$ and $\Delta a=(Q^TDQ+2\lambda)^{-1}[2a\Delta\lambda+r]$.

6) Determine in decision block 67 if maximum absolute value of $\Delta a_j$'s is less than some small threshold, say $10^{-10}$.

7) If not, update $a \leftarrow a+\Delta a$ and $\lambda \leftarrow \lambda+\Delta\lambda$ in function block 68 before returning to function block 63 of the iteration loop.

8) Otherwise, stop and output final model in function block 69. We denote the values of a for any fixed M from this procedure as $a_{(M)}$.

In order to determine the optimal value of $\hat{M}$ for M in APMR, we use v-fold cross validation, where v can be some number between 5 and 10, as described hereinafter. First, the order of the training set examples $X_i$ are randomly permuted, and the resulting permuted training set is partitioned into v subsets, $W_1, W_2, \ldots, W_v$. In the case when the total number of examples n is not divisible by v, some of the $W_u$ may have one more example than some of the subsets. For each trial value of M, we first obtain an APMR model trained on $\{X-W_u\}$ and use this model to evaluate the loss on the validation set $W_u$ for each u. The loss is derived by using the APMR predicted probabilities from equation (2) and applying equation (7) to the example in the validation set to obtain $$\text{Loss}(W_u) = -\sum_{i \in W_u} [y_i lg_2 P_i + (1-y_i) lg_2(1-P_i)]. \quad (7)$$

The total cross-validation estimate for the loss for a given value M is then denoted by $$CL(M)=\Sigma_u \text{Loss}(W_u). \quad (8)$$

(For estimating CL(M), one can use the average of Loss $(W_u)$ as above, or alternatively, use the median of Loss $(W_u)$. In addition, for obtaining confidence bounds, one can also compute the variance of the average loss for each $W_u$ in equation (7).)

We use the following search for the optimal value $\hat{M}$ for which the corresponding $CL(\hat{M})$ value is the minimum. The search procedure proceeds by first evaluating CL(M) for some small number (say 5–10) of uniform distributed values of M values in the interval $M_{min}$ and $\|a_{(u)}\|^2$, where $M_{min}$ is a small positive value, say 0.1. Next, one proceeds by taking the current best value M' and its two adjacent increment values, $M_-$ and $M_+$, and applying the cross-validation procedure using APMR for some odd number of M values (say 5–9) in equal increments between M and $M_+$. The best value among these (and the original best value M') is then taken as the final optimum value $\hat{M}$ for M. This cross-validation procedure can be summarized as follows:

Cross validation procedure to determine optimum M for APMR:

1) Randomly permute the order of the examples in X, and partition the training set in to v subsets $W_1, W_2, \ldots, W_v$.

2) Find $a_{(u)}$ by the APM procedure on the training data X.

3) Try APMR on a fixed number of M values between, say, 0.1 and $\|a_{(u)}\|^2$ and find the value M' that leads to the minimum value for CL(M), and consider the interval of the adjacent values $M_-$ and $M_+$ bracketing M'.

4) Optionally, using the same procedure as step (3) above, find the value M" that leads to the minimum CL(M) by examining an odd number of APMR trail solutions in the range ($M_-, M_+$)).

5) Use the best value as $\hat{M}$ (which is either M", or M' if step (4) is not performed) and obtain the final APMR solution using this value with the entire training set X.

The models generated by APM or APMR (with the optimal value $\hat{M}$ as above) can be used for obtaining the class probabilities for the examples in an independent test set or hold-out set. The class probability outputs can be used to generate a lift curve for a set of examples, e.g., for a set of potential customers who must be ranked by their predicted or model class probabilities.

Now we describe the method to estimate the basic statistics for computing the values of $q_0$ and $q_1$'s according to equations (2) and (3) or (4) in order to generate the Q matrix from the training data (X,y). These statistics are obtained by a simple counting procedure.

1) Estimation of P(C): Given that the number of examples belonging to the class of interest is $n_c$, we have $P(C)=n_c/n$.

2) Estimation of $Q_i$: The ith row of Q, namely $Q_i=\{q_{i1}, q_{i2}, q_{im}\}$, is obtained from the ith row of X, namely $X_i=\{x_{i1}, x_{i2}, x_{im}\}$, by estimating $P(C|x_y)$, which is the fraction of all given class examples that have the same value $x_y$ for the feature $x_i$. The $q_{iy}$ values are then computed using equation (5), in which $q_1$ is substituted by $q_{iy}$. The P(C|$x_j$) values are stored for each unique value of $x_j$ and can be reused for either constructing the Q matrix or for developing the relevant $q_1$ values when the model is used for prediction on test or hold-out data. For a numeric feature, one can use many different methods in the prior art for computing P(C|$x_j$), including discretization of the range of numerical feature into intervals followed by binning, or local smoothing and density estimation of the class conditional probabilities.

Figure 7:
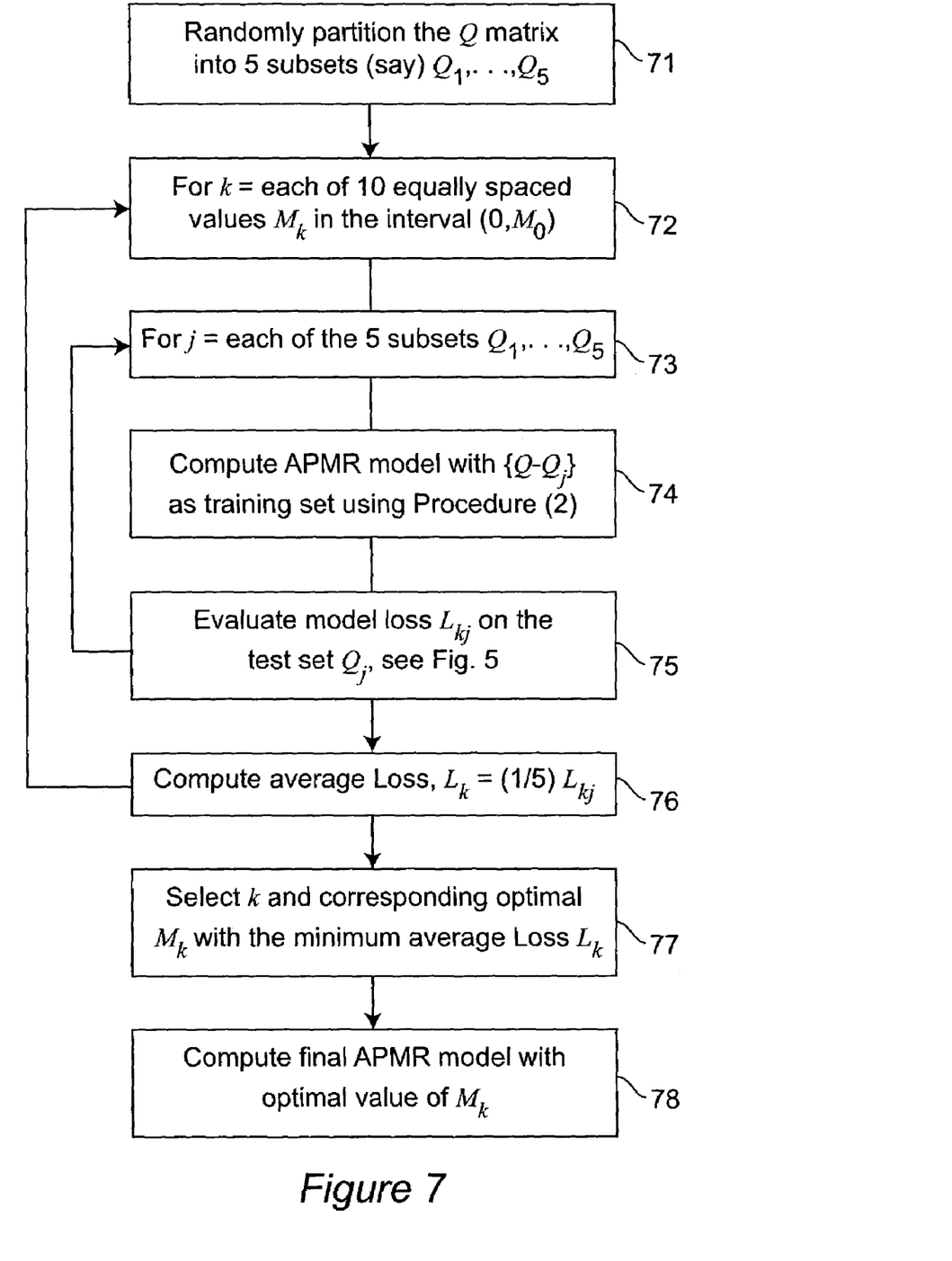
FIG. 7 is a flow diagram illustrating the logic of the cross-validation in APMR according to the invention.

The method of the constrained optimization of the APMR according to the invention is illustrated in the flow diagrams of FIG. 7. The process begins in FIG. 7 at function block 71 by randomly partitioning the Q matrix (FIG. 3) into, say five independent subsets $Q_1, \ldots, Q_5$. A first iteration loop is entered at function block 72 for k equal to each of ten equally spaced values $M_k$ in the interval (0,$M_0$). Next, a second iteration loop is entered at function block 73 for j equal to each of the five subsets $Q_1, \ldots, Q_5$. Within the nested loops, the AMPR model is computed in function block 74 with {Q-$Q_1$} as the training set using Procedure (2). Then, in function block 75, the model loss $L_{k_j}$ on the test set $Q_1$. This is shown in more detail in FIG. 8, to which reference is now made.

Figure 8:
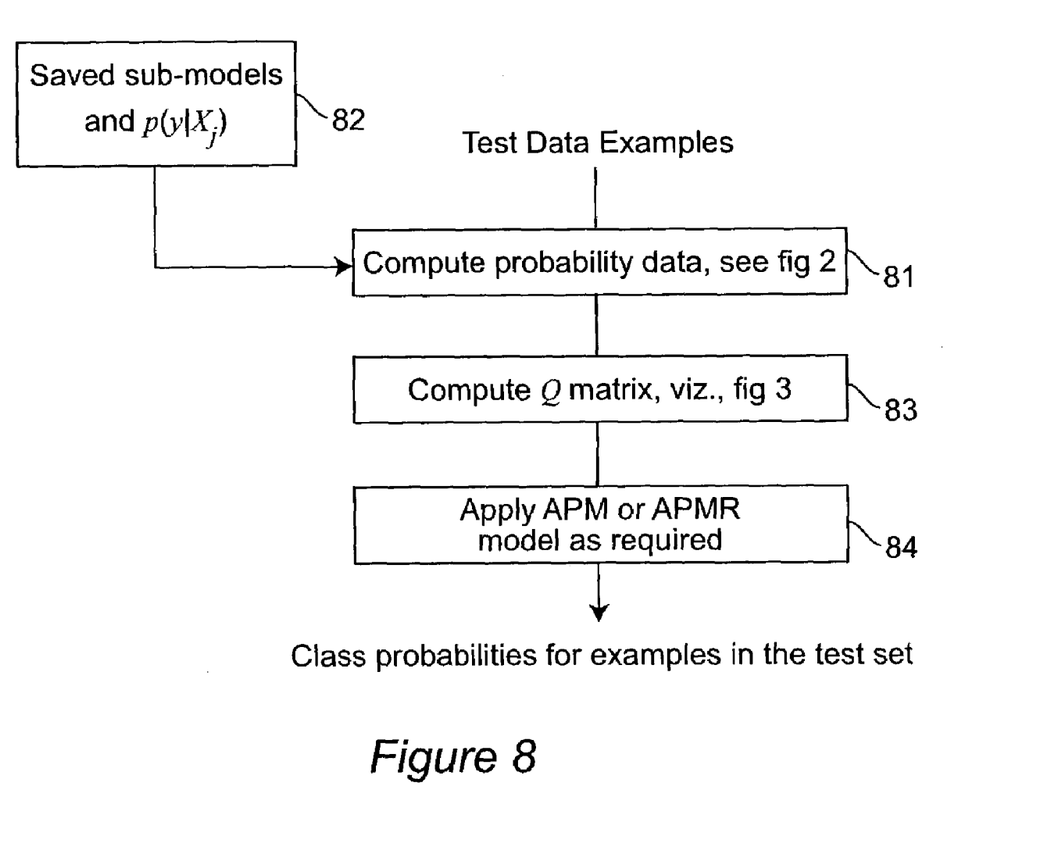
FIG. 8 is a flow diagram illustrating the application of an APM or APMR model to predict the class membership probability for each example in a test data set.

In FIG. 8, the test data examples $Q_j$ constructed from {Q-$Q_j$} from function block 74 are input to function block 81 which also receives saved sub-models and p(y|$X_j$) constructed from {Q-$Q_1$} from function block 82. In function block 81, the probability data of FIG. 2 is computed. Next, in function block 83, the Q matrix of FIG. 3 is computed. Finally, in function block 84, the APMR model from {Q-$Q_1$} is applied as required.

The procedure of FIG. 8 is applied to each of the five subsets $Q_1, \ldots, Q_5$, and when the iteration is complete, the average loss is computed in function block 76 for each of the ten equally spaced values $M_k$. When this iteration is complete, the value k and corresponding optimal $M_k$ is selected with the minimum average loss $L_k$ in function block 77. If necessary, the iteration in blocks 72 through 76 are repeated once more after bracketing the optimal value $M_k$; i.e., $M_- < M_k < M_+$ from the first iteration, and again using ten equally spaced values in the interval $M_-, M_+$. The final APMR model with optimal value of $\hat{M} = M_k$ is computed in function block 78.

In its generalized expression, the method according to the invention comprises of a program storage device readable by a machine, tangibly embodying a program of instructions executable by the machine to perform method steps for obtaining class probability estimates from individual items of evidence using the APM and APMR methods, the method steps comprising:

1) Specification of a probability model for aggregating multiple evidences as defined by equation (1).
2) Transformation of the training data to obtain the Q matrix based on the various evidences applied to each training example. as defined by equation (4).
3) Optimization of the loss function in equation (7) to obtain optimal values of the adjustment parameters using the APM method as outlined in Procedure (1).
4) If necessary, optimization of the loss function in equation (1) to obtain optimal values of the adjustment parameters $a_j$ subject to the regularization constraint $\Sigma a_j^2 = \hat{M}$, where the suitable
   value for $\hat{M}$ is determined using cross-validation, using the APMR method as outlined in Procedure (2). The $a_j$ parameters obtained from the APM method in Step (3) are normalized and used as initial guesses to the optimal parameters in Step (4).

In its generalized expression, the invention has significant advantages because it provides accurate class probability estimates, when compared to prior art. These accurate class probability estimates not only lead to lower error rates for classification, but are also useful for obtaining accurate estimates of the expected values of any function of the class variable, and for generating accurate lift curves in marketing and retail applications for identifying and prioritizing customers for targeted marketing.

In a particularized expression, for example, the novel method can be used for building predictive models that are then used for scoring or prediction in applications such as direct and targeted marketing, and in catalog retailing.

Experiments

We took most of the classification problems in the UCI data repository that do not have numerical features for our experiments. We used the following problems: DNA (3 classes, 60 features, 2000 training examples and a prescribed test set of 1186 examples), SDNA (3190 combined "original" examples of DNA, of which 15 examples have partially unknown feature values and were discarded), mushroom (2 classes, 23 features, 8124 examples), and vote (2 classes, 16 features, 435 examples). Following most other reported experiments on these problems, we treated "missing" as a separate value of each feature. The results are summarized in the tables below. In all cases, APMR produces a smaller loss than NB, often by a significant margin, and its classification error rates are also often superior to those of NB DNA: (No Laplace Correction)

| Class | Method | Error (%) | Loss |
|---|---|---|---|
| 1 | NB | 3.63 | 0.13 |
|  | APM | 2.70 | 0.12 |
|  | APMR | 2.50 | 0.10 |
| 2 | NB | 3.12 | 0.19 |
|  | APM | 4.22 | 0.20 |
|  | APMR | 3.51 | 0.17 |
| 3 | NB | 8.09 | 0.32 |
|  | APM | 6.49 | 0.24 |
|  | APMR | 6.41 | 0.23 |
| All | NB | 5.40 | 0.25 |
|  | APM | 3.96 | 0.24 |
|  | APMR | 3.49 | 0.24 (0.00) |

SDNA: (No Laplace Correction)

| Class | Method | Error (%) | Loss |
|---|---|---|---|
| 1 | NB | 3.12 (0.97) | 0.13 (0.05) |
|  | APM | 2.65 (0.93) | 0.13 (0.06) |
|  | APMR | 2.50 (0.75) | 0.12 (0.05) |
| 2 | NB | 2.99 (0.89) | 0.18 (0.08) |
|  | APM | 3.27 (0.85) | 0.17 (0.08) |
|  | APMR | 2.87 (0.77) | 0.16 (0.07) |
| 3 | NB | 7.78 (1.46) | 0.30 (0.05) |
|  | APM | 6.28 (1.48) | 0.24 (0.05) |
|  | APMR | 6.12 (1.36) | 0.23 (0.03) |
| All | NB | 4.36 (1.05) | 0.25 (0.09) |
|  | APM | 4.27 (1.09) | 0.25 (0.09) |
|  | APMR | 3.90 (1.09) | 0.24 (0.08) |

Mushroom: (Modified Laplace Correction, L=1/n)

| Class | Method | Error (%) | Loss |
|---|---|---|---|
| | NB | 0.45 (0.23) | 0.02 (0.01) |
| | APM | 0 | 0 |
| | APMR | 0 | 0 |

Vote (Modified Laplace Correction, L=1/n)

| Class | Method | Error (%) | Loss |
|---|---|---|---|
| | NB | 9.72 (4.27) | 0.94 (0.48) |
| | APM | 4.66 ((2.89) | 0.29 (0.33) |
| | APMR | 4.25 (2.75) | 0.20 (0.16) |

While the invention has been described in terms of preferred embodiments, those skilled in the art will recognize that the invention can be practiced with modification within the spirit and scope of the appended claims.

The invention claimed is:

1. A computer implemented method for aggregating items of evidence from multiple probability predictive models providing improved class probability estimation by multiplicative adjustment of class probability comprising the steps of:
   a) combining items of probabilistic evidence given by prior probability of a class with successive multiplicative adjustments to obtain an adjusted probability model for a class of interest; and
   b) optimizing the adjusted probability model by optimizing a loss function, which measures the fitness of the predictions, to obtain optimal values of adjustment parameters for the adjusted probability model; and
   c) providing the APM in a computer usable form to one or more processors to allow class probability estimation to introduced input.

2. The computer implemented method for aggregating items of evidence from multiple probability predictive models recited in claim 1, wherein the step of optimizing parameters of the adjusted probability model is performed subject to regularization constraints and subject to the use of a cross-validation procedure to determine an optimal value of the constraints.

3. The computer implemented method for aggregating items of evidence from multiple probability predictive models recited in claim 1, further comprising the step of using the adjusted probability model for producing a lift curve.

4. A computer implemented method for aggregating items of evidence from multiple probability predictive models, comprising the steps of:
   a) specifying a probability model for aggregating multiple evidences as defined by $$P(C|X) \propto P(C) \times \prod_{j=1}^{m'} \left[\frac{P(C|E_j)}{P(C)}\right]^{a_j},$$

where P(C) is prior probability of a class C, $P(C|E_j)$ is probability of the class C given evidence $E_j(X)$, with $P(C|E_j)$ being directly estimated from examples in training data (X,y), and $a_j$ are adjustment parameters having a role of controlling influence of the ratio $P(C|E_j)/P(C)$;
   b) transforming training data to obtain a Q matrix, where an entry $q_{ij}$ of the Q matrix is computed by $$q_{ij} = lg_2\left(\frac{(1 - P(C))P(C|X_{ij})}{P(C)(1 - P(C|X_{ij}))}\right),$$

where P(C) is a prior probability based on various evidences applied to each training example;
   c) optimizing a loss function given by $$Loss = -\sum_{i=1}^{n} [y_i lg_2 P(C|X_i) + (1 - y_i) lg_2 (1 - P(C|X_i))]$$

to obtain optimal values of adjustment parameters $a_j$, denoted $a_u$, where subscript u stands for unconstrained; and
   d) providing the probability model derived with consideration of the adjustment parameters to one or more computer processors to allow class probability estimation to introduced input.

5. The computer implemented method for aggregating items of evidence from multiple probability predictive models recited in claim 4, wherein the step of optimizing comprises the steps of:
   a) initializing adjustment a parameters to zero for j=1 through m';
   b) computing an n-vector P whose ith element is $P_i$=P($C|X_i$) and forming a diagonal matrix D whose ith diagonal element is $P_i(1-P_i)$;
   c) computing an update $\Delta a = (Q^T D Q)^{-1} Q^T (y-P)$;
   d) updating $a \leftarrow a + \Delta a$; and
   e) stopping if maximum absolute value of $\Delta a_j$'s is less than a predetermined threshold;
   f) otherwise, returning to step (b) and continue iteration.

6. The computer implemented method for aggregating items of evidence from multiple probability predictive models recited in claim 4, further comprising the step of optimizing a loss function to obtain optimal values of the adjustment parameters $a_j$ subject to a regularization constraint $\Sigma a_i^2 = \hat{M}$, where a suitable optimal value for $\hat{M}$ is determined using a cross-validation procedure to obtain an adjusted probability model-regularized (APMR).

7. The computer implemented method for aggregating items of evidence from multiple probability predictive models recited in claim 6, wherein the cross-validation procedure comprises the steps of:
   a) randomly permuting an order of the examples in X and partitioning the training set in to v subsets $W_1, W_2, \ldots, W_v$;
   b) finding $a_{(u)}$ on training data X;
   c) trying APMR on a fixed number of M values between 0.1 and $\|a_{(u)}\|^2$ and finding a value M' that leads to the minimum value for CL(M), where total cross-validation estimate for the loss for a given value M is then denoted by $CL(M) = \Sigma_u Loss(W_u)$, and considering an interval of the adjacent values $M_-$ and $M_+$ bracketing M';
   d) repeating APMR for a fixed number of M values in $(M_-, M_+)$; and e) using a best value $\hat{M}$ with a minimum cross-validation loss $CL(\hat{M})$ and obtain an APMR solution using this value with an entire training set X.

8. The computer implemented method for aggregating items of evidence from multiple probability predictive models recited in claim 7, wherein the step of finding $a_{(u)}$ on training data X comprises the steps of:

a) initializing adjustment $a_j$ parameters to zero for j=1 through m';

b) computing an n-vector P whose ith element is $P_i = P(C|X_i)$ and forming a diagonal matrix D whose ith diagonal element is $P_i(1-P_i)$;

c) computing an update $\Delta a = (Q^T D Q)^{-1} Q^T (y-P)$;

d) updating $a \leftarrow a + \Delta a$; and e) stopping if maximum absolute value of $\Delta a_j$'s is less than a predetermined threshold;

f) otherwise, returning to step (b) and continue iteration.

9. The computer implemented method for aggregating items of evidence from multiple probability predictive models recited in claim 7, wherein the step of trying APMR includes the steps of:

a) Initializing $$a = a_{(u)} \left( \frac{M}{\|a_{(u)}\|^2} \right)^{\frac{1}{2}}$$

and $\lambda=0$;

b) Computing P: $P_i = P(C|X_i)$, i=1, ..., n;

c) Forming a diagonal matrix D whose ith diagonal element is $P_i(1-P_i)$, i=1, ..., n;

d) Computing vector $v = Q^T(P-y) - 2\lambda a$ and vector $s = \|a\|^2 - M$;

e) Computing $\Delta\lambda = [4a(Q^TDQ+2\lambda)^{-1}a^T\}^{-1}[s-2a(Q^TDQ+2\lambda)^{-1}r$ and $\Delta a = (Q^TDQ+2\lambda)^{-1}[2a\,\Delta\lambda+r]$;

f) Determining if maximum absolute value of $\Delta a_j$'s is less than some small threshold, say $10^{-10}$;
If not, updating $a \leftarrow a+\Delta a$ and $\lambda \leftarrow \lambda+\Delta\lambda$;
Otherwise, stopping and outputting final model.

10. The computer implemented method for aggregating items of evidence from multiple probability predictive models recited in claim 4, further comprising the step of using the adjusted probability model for producing a lift curve.

* * * * *